(12) United States Patent
Ruge

(10) Patent No.: US 8,162,133 B2
(45) Date of Patent: Apr. 24, 2012

(54) SUPPORT DEVICE FOR CONVEYING HEAVY LOADS

(75) Inventor: Martin Ruge, Starrkirch-Wil (CH)

(73) Assignee: WRH Walter Reist Holding AG, Ermatingen (CH)

( * ) Notice: Subject to any disclaimer, the term of this patent is extended or adjusted under 35 U.S.C. 154(b) by 0 days.

(21) Appl. No.: 12/861,320

(22) Filed: Aug. 23, 2010

(65) Prior Publication Data

US 2011/0042187 A1 Feb. 24, 2011

(30) Foreign Application Priority Data

Aug. 24, 2009 (CH) ..................................... 1307/09

(51) Int. Cl.
*B65G 17/24* (2006.01)
(52) U.S. Cl. ......................... 198/779; 198/600
(58) Field of Classification Search .................. 198/779, 198/600
See application file for complete search history.

(56) References Cited

U.S. PATENT DOCUMENTS

| 4,807,525 | A   | * | 2/1989 | de Brock ........................ | 198/779 |
| 7,210,569 | B1  | * | 5/2007 | Tarhan et ...................... | 198/600 |
| 2008/0145197 | A1 | | 6/2008 | Taylor | |
| 2011/0132725 | A1 | * | 6/2011 | Marshall et al. ............. | 198/600 |

FOREIGN PATENT DOCUMENTS

| DE | 195 00 050 | 7/1996 | | |
| DE | 20 2007 011 352 | 10/2007 | | |
| FR | 2 504 998 | 11/1982 | | |
| FR | 2504998 | 11/1982 | | |
| GB | 1338218 | 11/1973 | | |
| GB | 2 201 199 | 8/1988 | | |
| JP | 51-130580 | 10/1976 | | |
| JP | 64-13325 | * | 1/1989 | ................... 198/779 |
| WO | 81/02333 | 8/1981 | | |

OTHER PUBLICATIONS

International Search Report.

* cited by examiner

*Primary Examiner* — James R Bidwell
(74) *Attorney, Agent, or Firm* — Rankin, Hill & Clark LLP

(57) ABSTRACT

A support device for conveying heavy loads includes a support body and a roller body which revolves around the support body, wherein the roller body includes a series of support rollers and distancing rollers, the distancing rollers have a smaller diameter than the support rollers, and the distancing rollers in each case space consecutive support rollers from one another, and the support device is provided for supporting a load which moves along a support region, and the roller body at least in the support region is covered in its whole width by a belt, and thus in the support region, the support rollers roll on the support body and on the belt.

19 Claims, 10 Drawing Sheets

A - A

B - B

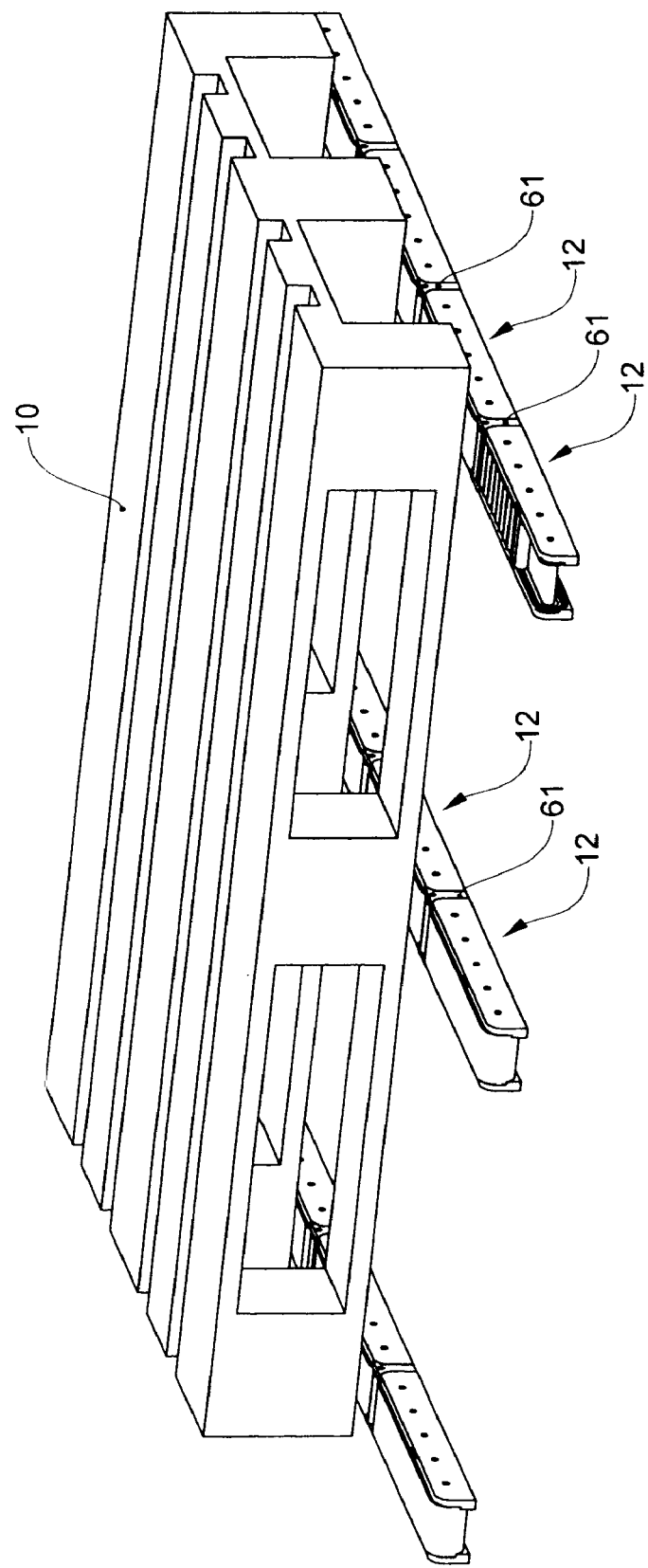

SUPPORT DEVICE FOR CONVEYING HEAVY LOADS

BACKGROUND OF THE INVENTION

1. Field of the Invention

The invention relates to the field of conveyor technology and in particular to a support device for conveying heavy loads.

2. Description of Related Art

For the horizontal conveying of heavy loads in material flow systems, roller conveyors are known for example, with which the loads roll on a series of individually mounted, stationary rollers. The bearings of the rollers and the rollers themselves support the weight of the load, and must be designed in a robust manner in accordance with the weight of the loads to be conveyed.

BRIEF SUMMARY OF THE INVENTION

It is the object of the invention to provide a support device for conveying heavy loads, of the initially mentioned type, which has a robust and inexpensive design.

The support device for conveying heavy loads thus comprises a support body and a roller body which revolves around the support body, wherein the roller body has a series of support rollers and distancing rollers, the distancing rollers have a smaller diameter than the support rollers, and the distancing rollers in each case distance consecutive support rollers from one another, and the support device is provided for supporting a load which moves along a support region, and the roller body at least in the support region is covered over its complete width by a belt, and thus the support rollers roll on the support body and on the belt, in the support region.

The belt, thus, covers or wraps around the roller bodies at least partly, at least in the support region. By way of this, the support rollers are protected from contamination. The distribution of the load onto a plurality of support rollers permits a design with lightweight, inexpensive materials. Preferably therefore, the support rollers and/or the distancing rollers are manufactured of plastic. A very easy rolling and conveying with very low friction losses is possible. The roller body comprises the entirety of the support rollers and distancing rollers, as well as any occurring bearing elements or support elements, which run with these rollers.

The belt may be made of a flexible material or band, or may be a (chain) link belt made of linked parts, such as a link conveyor belt, mat chain, hinge belt chain, plate belt chain, flex belt, chain belt, etc.

In a preferred embodiment of the invention, the support body comprises two peripheral guide grooves, and the support rollers are guided in the guide grooves by way of pivot stubs. Preferably, the distancing rollers are also guided in the guide grooves by way of pivot stubs. The pivot stubs may be designed as one piece on the respective rollers, or as part of continuous roller pivots, which are inserted into the rollers.

If the loading due to pushing (as opposed to pulling) forces is not too large, then no further mounting of the pivots is necessary, since the load for supporting the load is transmitted by the support rollers directly onto the support body. If a pushing force within the roller body, thus between the support rollers, is also to be transmitted, then preferably the support rollers and/or the distancing rollers are mounted by way of roller bearings or sliding bearings. Preferably thereby, the pivot stubs of the support rollers or the pivot stubs of the distancing rollers are fastened on the inner part of a bearing, whose outer part rolls in the respective guide groove. In another embodiment of the invention, the bearings are arranged within the support rollers and/or distancing rollers, and by way of this, the roller pivot is rotatable with respect to the respective roller. In a preferred embodiment of the invention, it is only the distancing rollers which are provided with bearings, in particular rolling bearings.

Thus, the distancing rollers are arranged in each case between the support rollers. Thereby, one or two distancing rollers may be arranged in each case between two adjacent support rollers. In the first case, the distancing rollers are preferably likewise mounted in the guide grooves. In the second case, in the support region between two support rollers, in each case an outer distancing roller rolls with its rotation axis outside a plane, which is defined by the rotation axes of the two support rollers, and an inner distancing roller within this plane (wherein the term "outside" and "within" are to be understood in relation to the support roller). Seen over the whole roller body, this means that the axes of the support rollers define a reference surface, in which they move, and the axes of an outer group of distancing rollers run outside the reference surface, and the axes of an inner group of distancing rollers run within the reference surface.

Preferably, in each case two distancing rollers are movably fastened on a support roller and together form a roller unit. In particular, for this, in each case at least one bearing element is arranged on a support roller. The support roller as well as the two distancing rollers, are rotatably mounted in the bearing element, wherein the two distancing rollers roll on the support surface. The mounting of the support roller on the bearing element may be loose, since it is merely to prevent the bearing body from falling over when the rollers are pulled apart. For example, the mounting may be effected by way of a snap connection between the bearing element and the roller pivot.

In a further preferred embodiment of the invention, a co-moved bearing element is present, but only the two distancing rollers are rotatably mounted in this, not the support rollers. Preferably, the shape of the bearing element is designed such that the bearing element does not fall over in the intermediate space between the belt and the support surface, even when the rollers are pulled apart. The distancing rollers together with the at least one bearing element, form a distancing element.

The pair of distancing rollers, be it now connected to a support roller or not, automatically centres itself (with respect to the reference surface), when the distancing rollers come into contact with the next support roller. With a pushing force, thus in the direction of the movement direction or revolving direction of the support rollers about the support body, with this, the roller units are pushed against one another and stabilised—an individual, middle distancing roller would thereby be pushed upwards or downwards. Thus, an improved transmission of pushing (as opposed to pulling) forces is possible with this paired arrangement of distancing rollers. This, for example, is relevant when two conveyed objects are in contact with the support device, and only one of these objects is pushed forwards by an additional drive means or by hand. The support device is then capable of transmitting this drive force onto the other object, so that this may be driven indirectly or co-moved. The manner of acting is independent of the revolving direction (clockwise or anti-clockwise) of the rollers.

The bearing element accommodates the forces, which arise on account of the support rollers pressed against one another and which would press the distancing rollers apart. These forces in turn may lead to friction losses in the bearings of the distancing rollers in the bearing element. For this reason, in further preferred embodiments of the invention, the distancing rollers are mounted in at least one bearing element by way of roller bearings, or the two distancing rollers are wrapped with a belt. The belt, for example of thin steel, may be wrapped around the whole of the rollers or also around thinner sections of the rollers or of the roller pivots. The belt accommodates the force, which drives the distancing rollers apart, and determines a maximal distance of the distancing rollers. One or both of the distancing rollers may thereby be mounted in an elongate hole, which permits a certain variation of the distance of the two distancing rollers.

In another preferred embodiment of the invention, a support device comprises a drive. This engages, for example, on the belt or on the roller body. Thereby, depending on the size of the conveyed objects, not all of several serial support devices need have a drive.

Since the roller units are preferably not connected to one another, they may be pulled apart or may distance themselves from one another during the revolving, in regions in which they are not loaded. If they approach one another again, the distancing rollers should bear correctly again on the next support roller. This is effected when the following condition is fulfilled: if the roller unit with the support roller and a lower distancing roller lies on the support surface (expressed more generally: on a plane which forms a tangent to the two rollers), and one applies a parallel plane parallel to the support surface through the rotation axis of the support roller, then the rotation axis of the upper distancing roller must lie above the parallel plane. In other words: the condition is fulfilled when a plane which runs through the rotation axis of the support roller and parallel to a tangent to the support roller and to one of the distancing rollers, said tangent being applied from the outside to the roller unit, runs through the rotation axes of the two distancing rollers. If this is the case, then the second distancing roller is lifted when it abuts a further support roller, which likewise rolls on the support surface. On pulling apart the two roller units, thus the distancing rollers tilt against the support surface and when the two roller units come together, the distancing rollers are set upright again. The roller unit is then centred again with respect to the reference surface.

In another preferred embodiment of the invention, no roller units are present, but the support body for guiding the distancing rollers, comprises further guide grooves which are different from the guide grooves for the support rollers. The pivot stubs of the distancing rollers are mounted in this at least one further guide groove. The further guide grooves thereby run parallel to the guide groove, within and/or outside the guide groove.

In further embodiments of the invention, a shoulder of a bearing element or of a bearing projects in the radial direction into the enveloping cylinder in each case of the adjacent support rollers and by way of this limits a movement of the support roller along the direction of its roller axis. The shoulders on both sides of the support roller, thus, encompass and lead the support rollers in the axial direction. In a preferred embodiment of the invention, the support rollers for guiding have no further projecting bearing elements such as roller pivot or pivot stubs, but are guided and aligned merely by way of the shoulders of the bearing elements or bearings of the distancing rollers.

A conveying device comprises two or more support devices, which are arranged in series behind one another. In each case, an intermediate element with at least one movable support element is arranged between the support devices. Thereby, the support element supports the conveyed objects in the transition region between two support devices. The support element consists, for example, of one or two or more intermediate rollers, i.e. rollers of a conventional type. The support devices and intermediate elements preferably form a modular construction system, with which support devices and intermediate elements may be strung together in an infinite manner, for forming a conveyor device. In a further embodiment of the invention, the intermediate elements are in the support devices, and the support devices with the integrated intermediate elements may be strung together, preferably with a positive fit.

Preferably thereby, the support devices and the intermediate elements may be strung together in the conveying direction with a positive fit. They are, thus, shaped such that an outer contour of a support device, at its end-faces, is shaped complementarily to the outer contour of the intermediate elements. Preferably, the support devices and intermediate elements furthermore also have correspondingly shaped connection elements. These for example permit the support devices and intermediate elements to be stuck together or flanged onto one another.

Moreover in a further, preferred embodiment, several rows with, in each case, several support devices and intermediate elements, are arranged parallel to one another, in the conveyor device. One may support and convey wider loads with this. For this, the rows of support devices may be distanced to one another in the direction normal to the conveying direction, or may also be connected to one another, in particular with a positive fit. Thereby for example, in each case the support devices of rows lying next to one another, are offset from one another in the longitudinal direction. Thereby, depending on the type of goods to be conveyed, one may make do without the application of intermediate elements.

Basically, a support device may also be realised without a belt. This, however, has the disadvantage that a contamination of the device is to be expected in the course of time in operation as a heavy load conveyor.

The device may be assembled in a fixed manner in the floor region of an installation, so that unit loads, pallets, assembly carriers, machine units, material carriers for conveyor belt stations and likewise may be transported as goods to be conveyed therewith. The device may also be arranged in a slightly inclined manner, so that the goods to be conveyed may be conveyed driven by gravity or by hand with little force. The inclined conveyor device may be used for aiding in a material buffer, in which unit loads or carriers are led to a processing station and in each case subsequent unit loads or carriers are post-conveyed by gravity on removal. Preferably, the conveyor device at least in sections is inclined to the horizontal at an angle of between 3° and 20°, preferably at an angle of about 10°.

Basically, it is also possible to fasten one or more support devices to a carrier instead of wheels, so that the carrier rolls on the floor.

In a preferred embodiment of the invention, at least one recess of the support surface is present in the support region, wherein a roller which is located in the region of the recess, may be moved into the recess.

According to a method for operating a conveyor device, on rolling the rollers in the support region of a support device of a conveyor device, the following steps are carried out:
 relieving the rollers on entering into a part region of the support region, for example of the mentioned recess;
 aligning the relieved rollers;
 renewed loading of the roller on leaving the part region of the support region.

By way of this, load forces which act on the rollers are reduced in the region of the recess. Preferably, no load force at all acts on the rollers there. The rollers, thus, in each case in the region of the at least one recess, essentially loose contact with the conveyed objects, for example a conveyor means. The rollers are relieved by way of this, so that the axis direction (rotation axis) of the rollers may be corrected more easily. By way of this, a roller, if it was tilted, which is to say if the direction of its rotation axis were not perpendicular to its rolling direction or to the conveying direction, may be aligned perpendicularly to the conveying direction again. The rotation axis of the rollers is defined, for example, by way of the rollers being shaped cylindrically or in a barrel-like manner. The term "rolling direction" here and hereinafter indicates the translatory movement component of the centre of gravity of a rolling roller.

This has the advantage that rollers, which—depending on the load and depending on the non-idealities in the shape of the rollers, the mounting of the rollers and of the support surface—tilt under load after a certain stretch, may be aligned again. With this, one prevents the tilted rollers from rubbing at their guides with their pivots and/or peripheral surfaces and/ or with their end-faces, and causing an excess wear. In turn, by way of this, it is possible to manufacture rollers and guides of inexpensive and lightweight materials.

The direction, in which the load acts on the support device and thus, via the rollers, on the support surface, as a rule is the direction of gravity. Hereinafter, for the sake of simplicity of the description, the explanations are above all to be assumed with regard to this context. The invention however may also be applied in this context to other directions of the loading.

The alignment of the roller pivots may be effected by one of the following effects, or by way of a combination of these effects:

with the rolling or sliding of the roller into the recess, the roller is relieved and aligns parallel to the recess. The moving into the recess may then be caused by the gravitational force and/or by way of a guiding of the rollers;

on moving up again out of the recess, the roller is pushed or pulled against the upwardly running support surface and is aligned parallel to the recess by way of this;

by way of lateral path narrowings, which engage on the end-sides of the roller and force the rollers laterally into a predefined position (preferably in the middle of the roller path) and thereby also align the axis direction of the rollers. Preferably thereby, the end-sides of the rollers are parallel to surfaces of the path narrowings.

The shape of the recess preferably corresponds essentially to the peripheral contour of a roller (seen in a longitudinal section along the rotation axis of the roller), in a cross section through the recess, in a section plane perpendicular to the conveying direction or rolling direction of the rollers. In a preferred embodiment of the invention, the recess is somewhat more pronounced in the region of the ends of the roller, thus in the regions on both sides of the middle line of the roller path, i.e. somewhat deeper than in the middle. It becomes simpler to rotate in the axis direction of the rollers by way of this Further preferred embodiments correspond to the dependent patent claims.

BRIEF DESCRIPTION OF THE DRAWINGS

The subject matter of the invention is described in more detail hereinafter by way of preferred embodiment examples which are represented in the accompanying drawings. In each case in a schematic manner, there are shown in:

FIG. 3 a use of a conveyor device, consisting of several support devices;

The reference numerals used in the drawings and their significance are listed in a conclusive manner in the list of reference numerals. Basically, in the drawings, the same parts are provided with the same reference numerals

DETAILED DESCRIPTION OF THE INVENTION

Figure 1A:
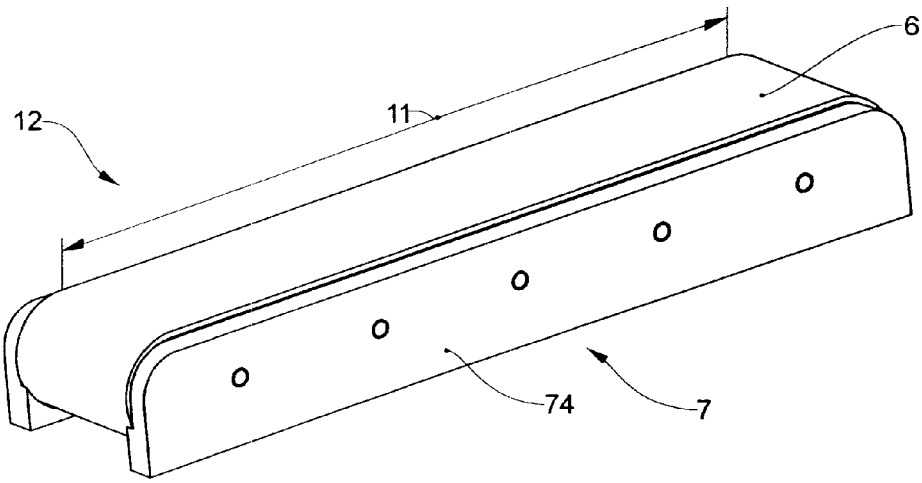
FIGS. 1-1d a view of a support device and three sections through this support device.
Figure 1B:
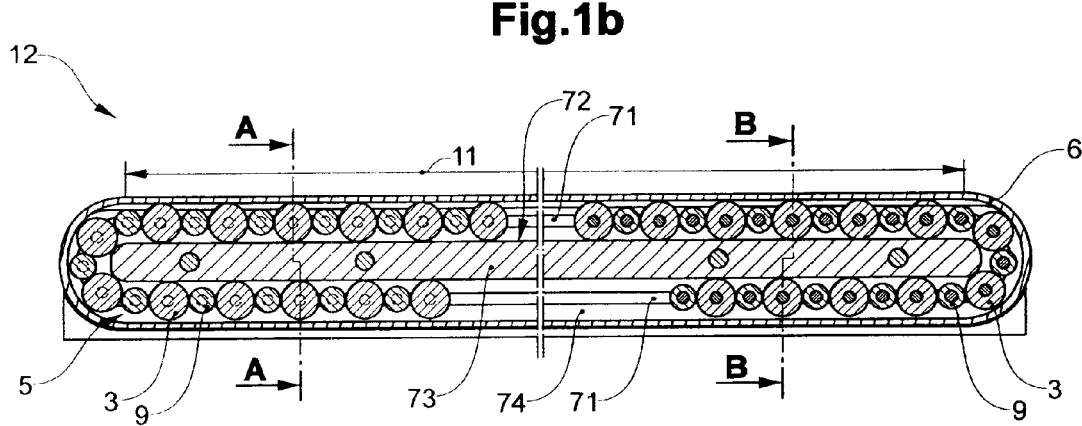
Figure 1C:
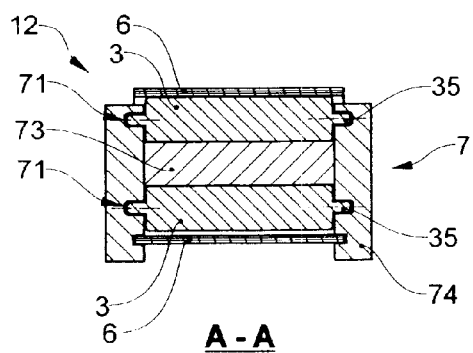
Figure 1D:
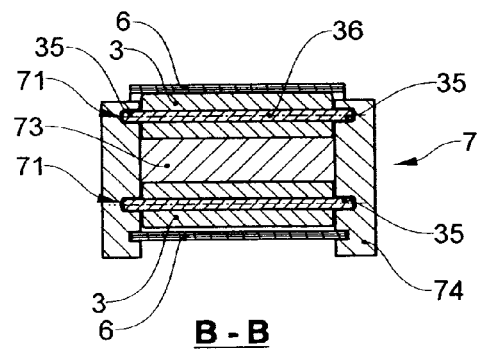

FIGS. 1a-1d show a view of a support device 12 and three sections through this support device 12. The support device 12 comprises a support body 7 with side elements 74, as well as a roller body 5 which revolves in the support body 7 and which is wrapped by a belt 6. Not all rollers 3 along the revolving path around the central body 73 are drawn, and in reality rollers 3 are thus present essentially along the whole revolving path. In the shown example the roller body 5 is wrapped by the belt 6 over its whole periphery, but it may also be wrapped or covered only in sections. The belt 6 to the top, along a support region 11, preferably covers the complete width of the roller body 5, so that this is protected from contamination. As is visible in the longitudinal section in FIG. 1b and in cross sections in FIGS. 1c, 1d, the roller body 5 in an alternating manner has large and small rollers, wherein the large rollers serve as support rollers 3 which transmit a load force from conveyed or supported objects (not drawn), which act on the belt 6 of and the support rollers 3, onto a central body 73 of the support body 7. The central body 73, in turn, is supported on the floor or in an installation by way of the side elements 74. The support rollers 3 are distanced from one another by way of the smaller rollers, hereinafter called distancing rollers 9. The support rollers 3 and the distancing rollers 9 roll on one another and are guided in guide grooves 71, which are formed in the side elements 74 and run along the revolving path of the rollers about the central body 73. This guiding is effected by way of axially projecting pivot stubs 35 of the support rollers 3, and pivot stubs 95 of the distancing rollers 9, which project into the guide grooves 71 and, thus, prevent the rollers 3, 9 from leaving the revolving path. The pivot stubs 35, 95 are designed on the rollers 3, 9 as one piece (FIG. 1c), or are inserted into the rollers 3, 9 as continuous roller pivots 36 (FIG. 1d). In the upper region or support region 11 of the support device 12, the belt 6 lies on the support rollers 3, and in the lower region or return section it may be distanced somewhat from the roller body 5 (FIGS. 1b-1d).

Figure 2A:
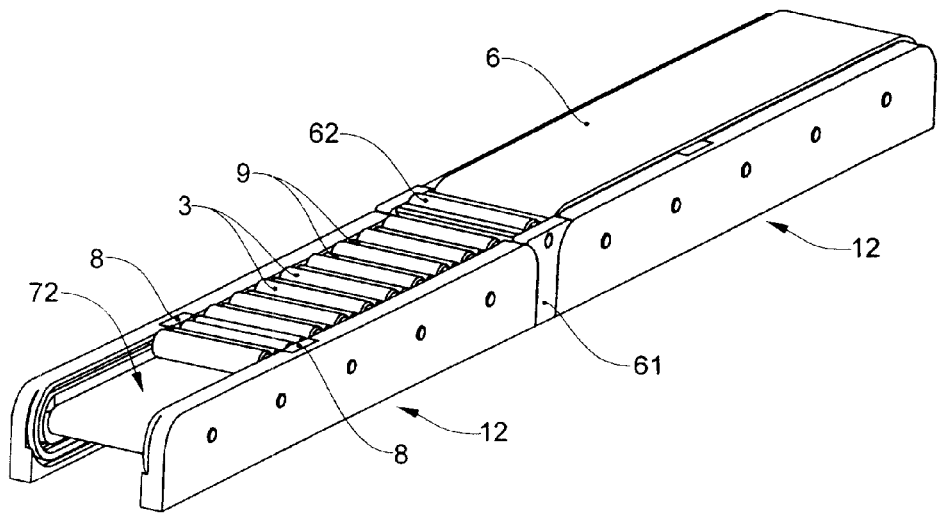
FIGS. 2a-2c a view of a support device and two sections through a further embodiment of a support device.
Figure 2B:
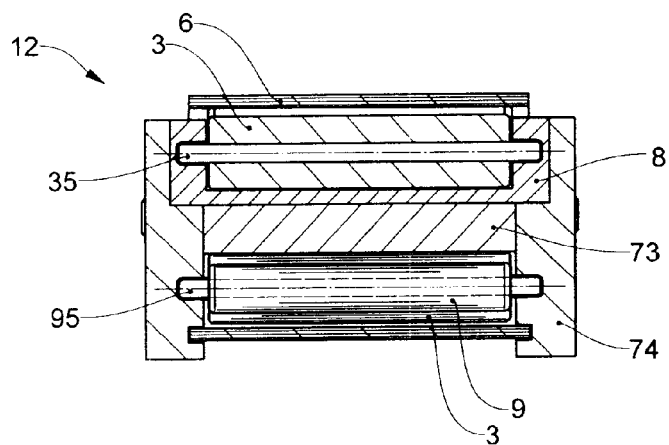
Figure 2C:
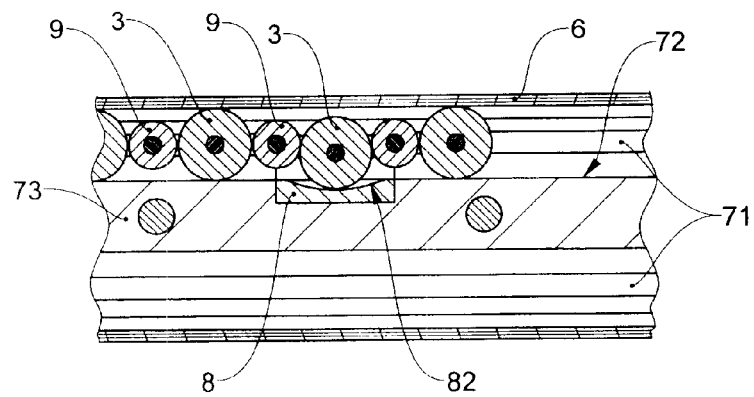

FIGS. 2a-2c show a view of a support device and two sections through a further embodiment of a support device with a recess 82 in a support surface 72 of the central body 73. Here too, not all rollers 3 are drawn along the revolving path about the central body 73. FIG. 2a furthermore also shows a serial stringing-together of two support devices 12, with an intermediate element 61 arranged therebetween. Such a stringing-together is of course also possible with the support device 12 according to FIGS. 1*a*-1*d*.

FIG. 2*c* shows a lateral view in the region of the recess 82 with a removed side element 74, and in FIG. 2*b* a cross section in the region of the recess 82. The recess 82 serves for relieving and for aligning the rollers 3, in the case that they tilt, whilst rolling between the belt 6 and the support surface 72. The tilting increases the wear of the support device 12, for example by way of the support rollers 3 running laterally against the guide and the end-faces or their edges rubbing on the guide. The recess 82, by way of example, is designed in a separate relief element 8, but may also be recessed out of the central body 73 or the side elements 74.

The support surface 72 supports the rollers 3 in the support region 11, and thus also, in a direct manner or via the belt 6, the conveyor means or conveyed goods (not drawn). In the region of the recess 82, the respective rollers 43 which are located there are freed from the load. The rollers 3 there, due to gravity and/or by way of a lateral guiding of the rollers 3, move downwards somewhat away from the belt 6. By way of this, they are easier to move and in the case that they get with their rotation axis into an oblique position, in the load-carrying region, may align again, i.e. so that their rotation axis runs perpendicular to the rolling direction of the rollers 3.

Only one relief element 8 is drawn in FIG. 2*a*, but also several relief elements 8 may be arranged along the support region 11.

The support devices 12 according to the FIGS. 1*a*-1*d* and 2*a*-2*c* comprise endlessly circulating rollers 3. In an analogous manner of course, a support device with rollers moving to and fro, thus with non-circulating rollers or only with purely linearly moved rollers, may also be present and optionally be provided with a recess 82. Thereby, the symmetry of the recess has an effect in the movement direction (forwards or backwards), by way of the same effect occurring irrespective of the movement direction.

The recesses 82 are drawn in the FIGS. 2*a* to 2*c* as separate elements or relief elements 8. In other embodiments of the invention, they may however also be formed on the support surface 72 and on the side elements 74, thus without a separate component being required for forming the recess 82.

FIG. 3 shows an application of a conveyor device of several support devices 12. Thus on the one hand several support devices 12 are arranged in series, in each case with an intermediate element 61 for mounting the conveyed products 10, between the support devices 12. On the other hand, several such series of support devices 12 are arranged parallel to one another, in order to be able to support and convey wide conveyed products 10.

Figure 4A:
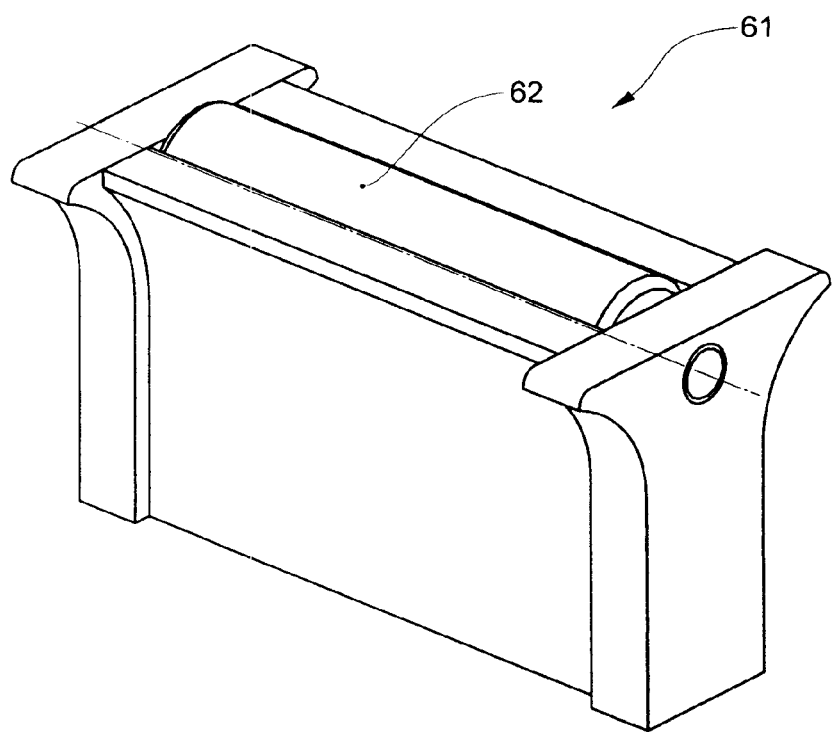
FIGS. 4a-4b an intermediate element.
Figure 4B:
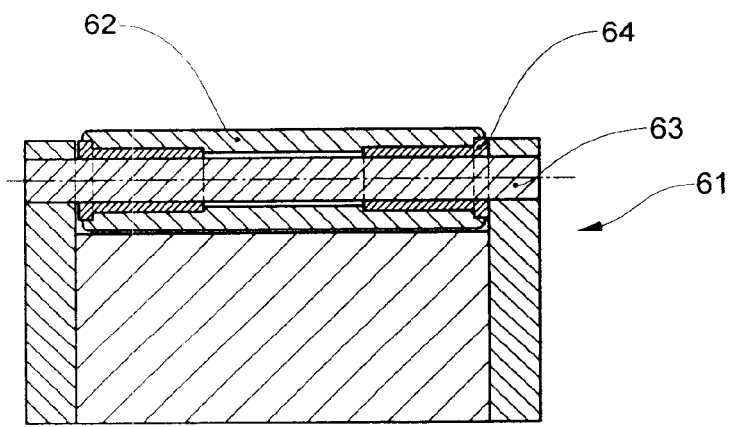

FIGS. 4*a*-4*b* show an intermediate element 61 with, for example, a single intermediate roller 62. The intermediate roller 62 may rotate about a pivot 63 by way of a bearing 64, as shown by way of a sliding bearing. In other embodiments of the invention, the bearing is a rolling bearing in the stationary part of the intermediate element 61 or in the intermediate roller 62. The outer shape of side parts of the intermediate element 61 (seen in the conveying direction) corresponds to the outer shape of the side elements 74 of the support devices 12, so that they may be joined together with a positive fit. Further positive fit elements (not shown) and/or flanges for screw connections may be provided for connection.

Figure 5:
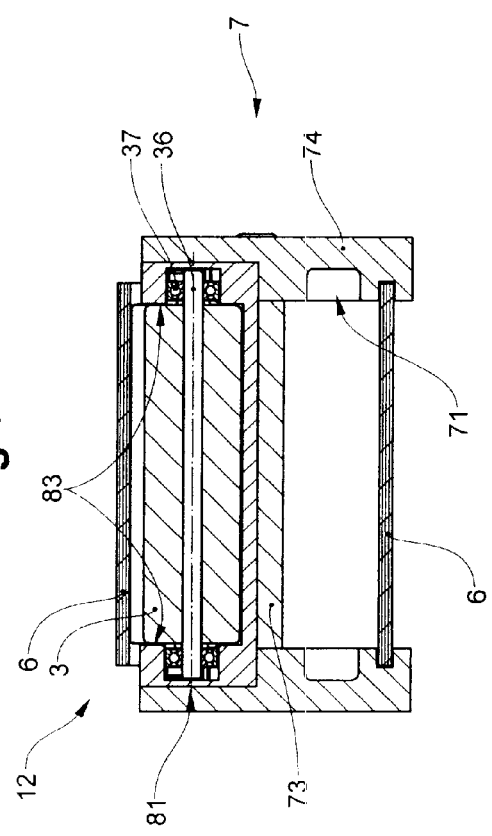
FIG. 5 a section through a support device with roller bearings.

FIG. 5 shows a section through a support device with roller bearings 37. It is shown by way of example, how roller bearings are arranged on a roller pivot 36 of a support roller 3. The distancing rollers 9 may also be mounted in the guide groove 71 in the same manner. With this embodiment of the invention, friction forces and wear which occur when the roller body 5 is loaded in the movement direction by way of pushing forces, are reduced further, and by way of this, the roller axes 36 are pushed away in a direction perpendicular to the plane of the guide grooves 71.

Figure 6:
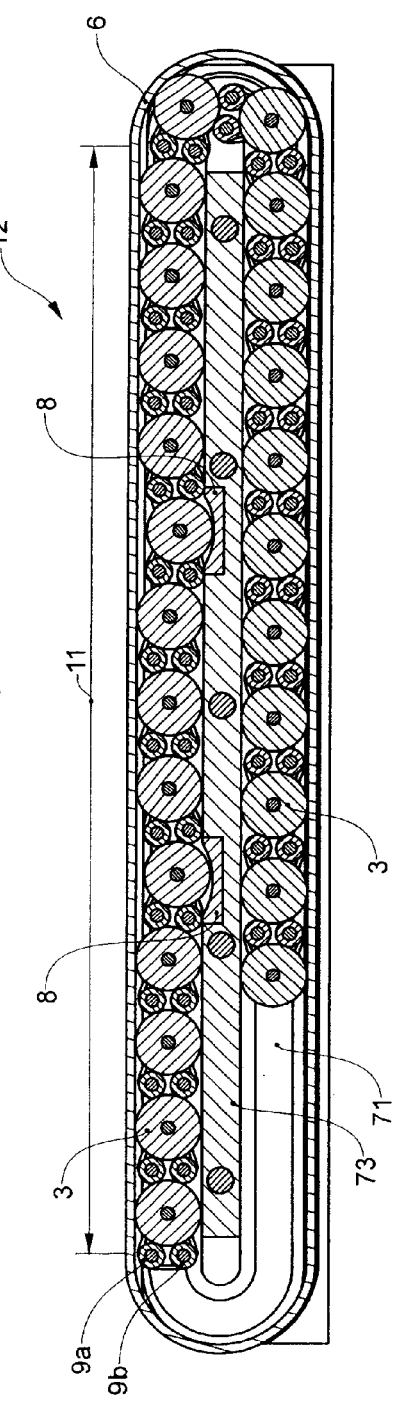
FIG. 6 a cross section through a support device in a further embodiment of the invention.

FIG. 6 shows a cross section through a support device in a further embodiment of the invention. Here, in each case two distancing rollers 9 are arranged between two support rollers 3. The distancing rollers 9 roll on the support rollers 3. The distancing rollers 9 lie in the support region 11 with their axes in each case above and below a plane (parallel to the support surface 72) through the axes of the support rollers 3 (with the exception of those support rollers 3, which are lowered in the region of a recess 82). In each case, the two distancing rollers 9 are held together in the vertical direction, thus normally to the support surface 72, so that pushing forces may be transmitted between the support rollers 3. Due to the fact that the rollers and roller units may transmit pushing (as opposed to pulling) forces, it is possible for a conveyed object, which is pushed over a support device 12, to indirectly drive other objects, which are likewise located on the same support device 12, via the roller body in the load [belt] section and to convey them further.

The relief elements 8 drawn in FIG. 6 or their recesses act in the same manner as that explained by way of FIG. 2*a*-2*c*. The support device 12 of FIG. 6 may however also be realised without relief elements 8.

Figure 7:
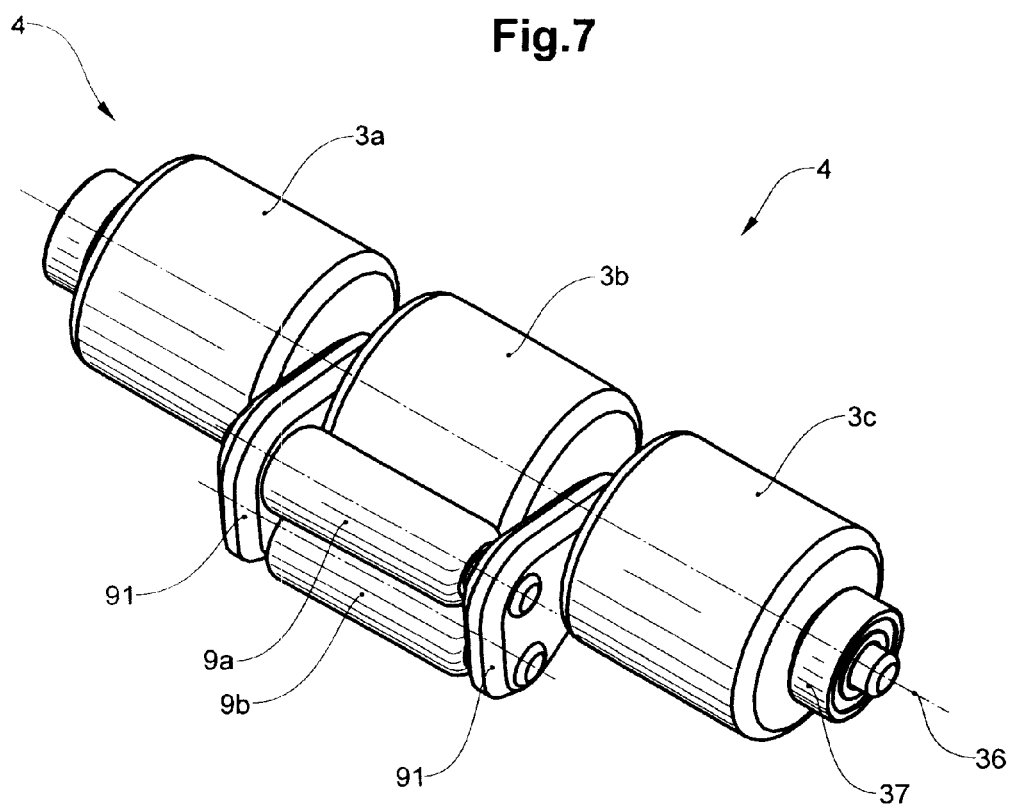
FIG. 7 a roller unit.
Figure 8:
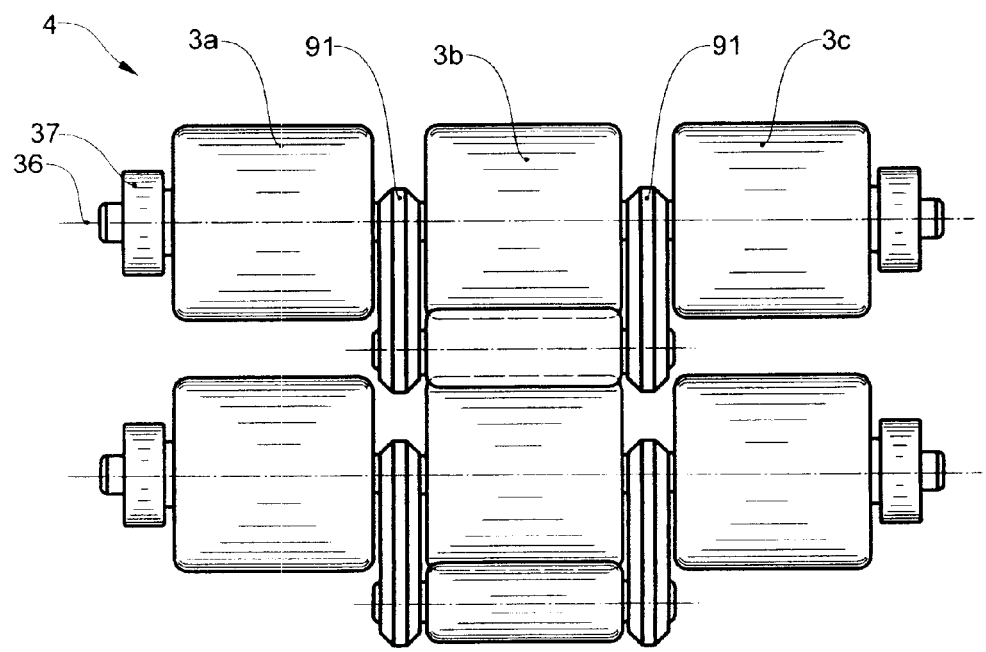
FIG. 8 two roller units arranged behind one another, in a plan view.

FIG. 7 shows a roller unit 4 and FIG. 8 two roller units 4 which are arranged behind one another, in a plan view. In the roller units, in each case a support roller 3 and two distancing rollers 9 (here indicated individually as 9*a* and 9*b*) are movably connected to one another, i.e. all three are mounted in the bearing elements 91. The bearing elements 91 may basically be arranged close to the ends of the roller axes 36, so that a one-part support roller 3 and the two distancing rollers 9 lie between the bearing elements 91. In the shown example, the bearing elements 91 are however distanced to the ends, so that the support roller 3 has at least three coaxial sections 3*a*, 3*b*, 3*c* of the same diameter, which are connected to one another via the roller axis 36. In each case, between two of these sections, a bearing element 91 is rotatably arranged on the roller pivot 36 and projects in the radial direction beyond roller sections, Two distancing elements 9 are mounted between the two bearing elements (several sections of rollers—they then support rollers or distancing rollers—which are arranged coaxially to one another and move with one another, are in each case considered as a roller).

Figure 9:
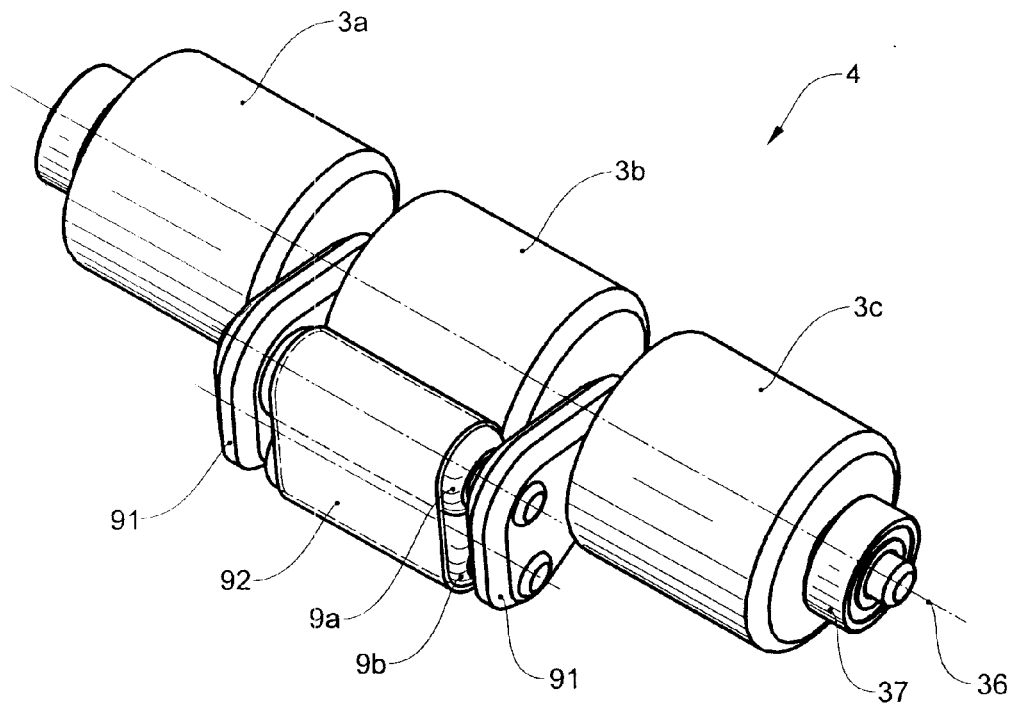
FIGS. 9-12 roller units with a holding belt for relieving the pivots of the distancing rollers.
Figure 10:
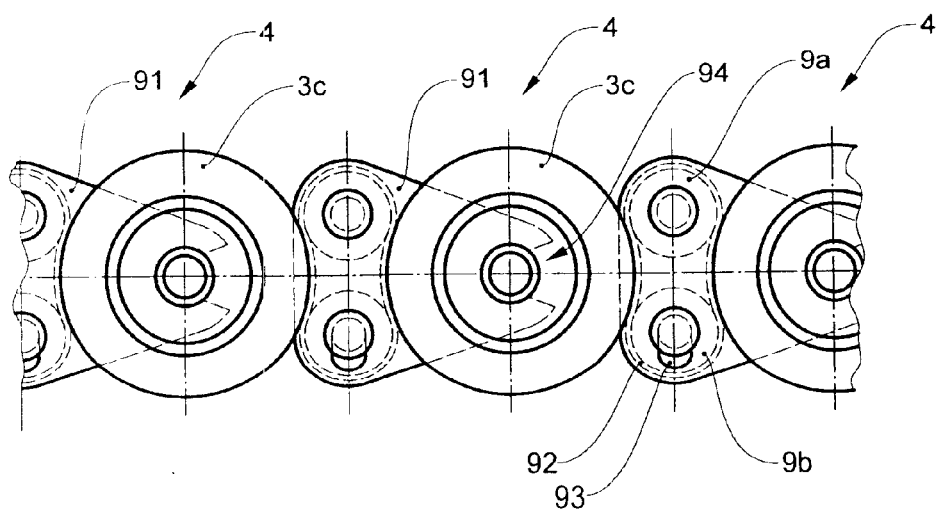

FIGS. 9-12 show roller units with a holding belt 92 for relieving the pivots of the distancing rollers. FIGS. 9 and 10 show views of a roller unit 4 similarly to those of FIGS. 7 and 8, but with a holding belt 92 which is wrapped around the two distancing rollers 9*a*, 9*b*. A bearing location of at least one of the distancing rollers 9*a*, 9*b*, here for example the lower one, is designed as an elongate hole 93. In the unloaded condition, the lower roller slips downwards. In the loaded condition, as is shown in FIG. 10, the distancing rollers 9*a*, 9*b* are pushed apart (to the top and to the bottom) by way of the support rollers 3 or by way of the middle section 3*b* of these, but are held together by the holding belt 92. The holding belt 92 runs between through between the support rollers 3 and the distancing rollers 9, and partly along the distancing rollers 9. In FIG. 10, a snap connection 94 is shown in a dashed manner between the bearing elements 91 and the axis 63 of the roller sections of the support roller 3. These permit a simple assembly of the roller unit 4.

Figure 11:
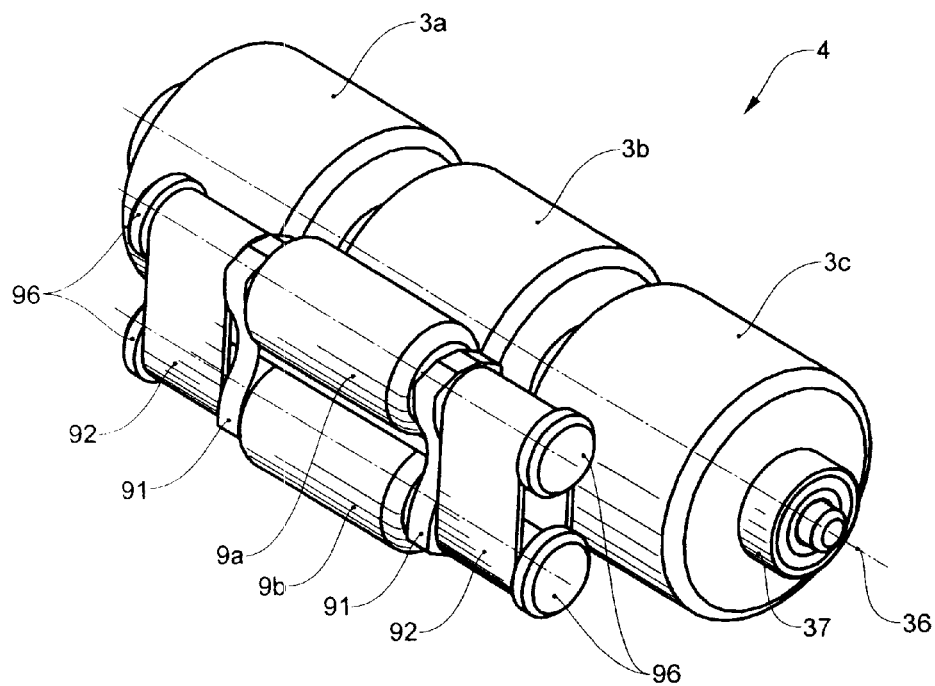
Figure 12:
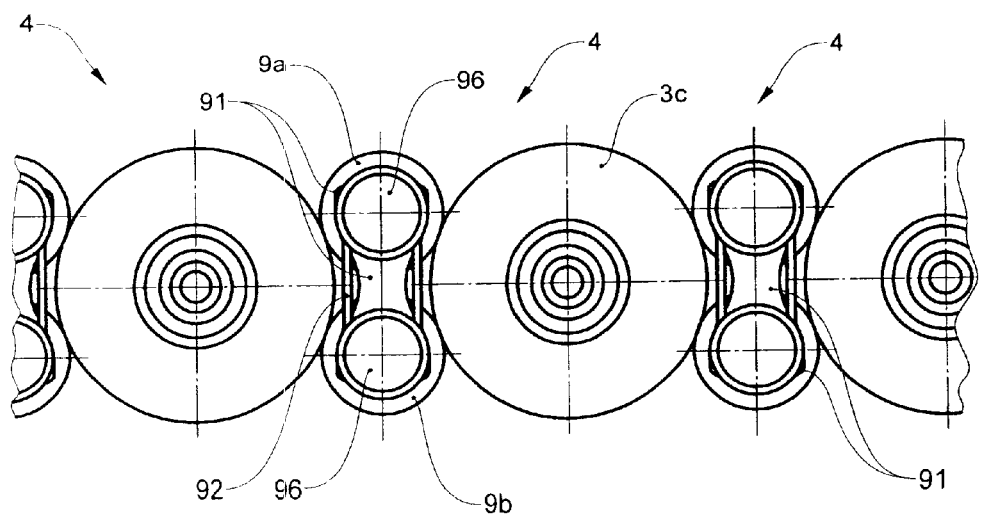

FIGS. 11 and 12 show a further embodiment with a holding belt 93, which does not run around the distancing rollers 9 itself, but around pivot extensions 96 of the distancing rollers 9. Thus here too, the holding belt 93 relieves the pivot bearings of the distancing rollers 9, by way of it preventing the pivots distancing from one another beyond a given amount. Here too, the distancing rollers are mounted in bearing elements 91 and are preferably connected to the support roller sections 3a, 3b, 3c.

FIGS. 13-16 show bearing elements 91 and distancing rollers 9 which are not fastened on support rollers 3. The bearing elements 91 together with the distancing rollers 9 form a distancing element 2. The distancing elements 2 are movable in a loose manner with respect to the support rollers 3, and the roller body 5 may be pulled apart along the revolving path of the rollers. In FIGS. 13-16, a shoulder 98, 99 of a bearing element 91 or of a bearing 97 projects in the radial direction into the enveloping cylinder of the support roller 3, and by way of this limits a movement of the support roller 3 along the direction of the roller axis 36. In contrast to a variant without the shoulders 98, 99, only a rotating movement occurs between the shoulders 98, 99 and the support rollers 3. Without the shoulders 98, 99, the support rollers 3 could also rub on the side elements 74 with a translatory movement.

Figure 13:
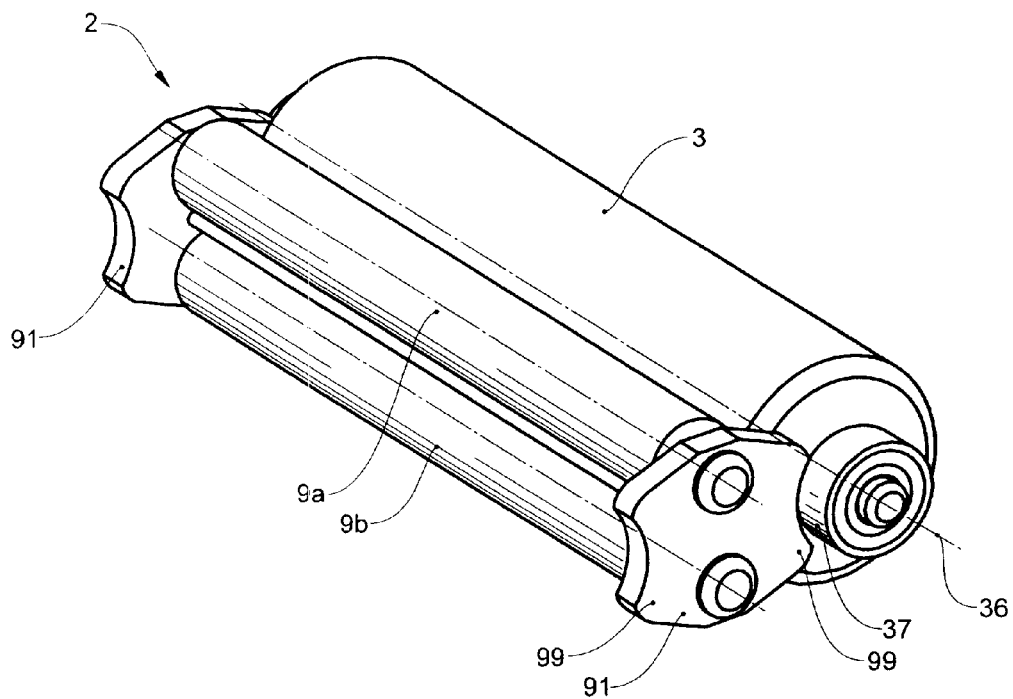
FIGS. 13-16 bearing elements and distancing rollers which are not fastened on support rollers.
Figure 14:
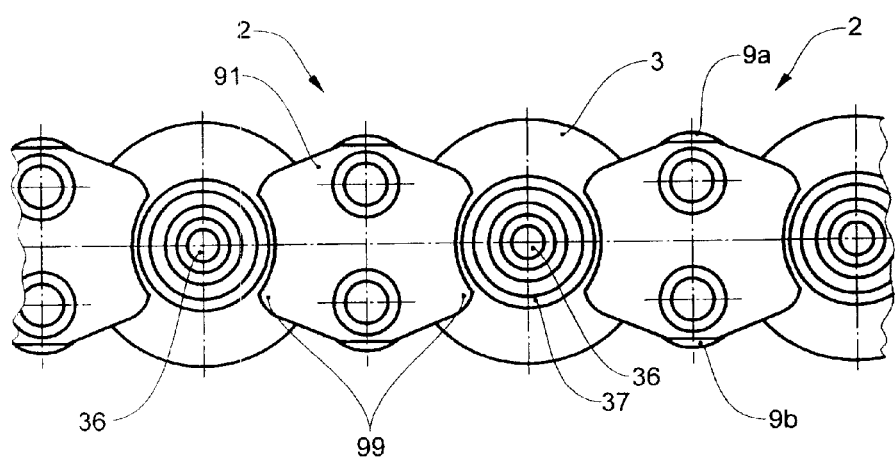

FIGS. 13 and 14 show views of support rollers 3 and distancing elements 2, wherein the bearing elements 91 of the distancing elements 2 in each case comprise two shoulders 99 which encompass the support rollers 3 in the axial direction. The shoulders comprise concave sections which are directed towards the roller axes 36 of the support rollers 3. Here too, holding belts may be applied around the distancing rollers 9 or their pivots. The distancing rollers 9 project in a direction perpendicular to the support surface 72, a little beyond the edge of the bearing elements 91. If the roller bodies are relieved in the conveying direction, then the distancing elements 2 slide downwards onto the support surface 72, and also in this position roll along the support surface 72 and slip with a part of the bearing elements 91. If, under load in the conveying direction, the support rollers 3 are again pushed against one another, then the roller pivots 36 of the support rollers 3, or also roller bearings 37 (or sliding bearings, not drawn) of the support rollers 3, slip into the concave sections of the bearing elements 91 and lift the bearing elements 91 up again, until the distancing rollers 9 lie symmetrically to the plane through the roller axes 36.

Figure 15:
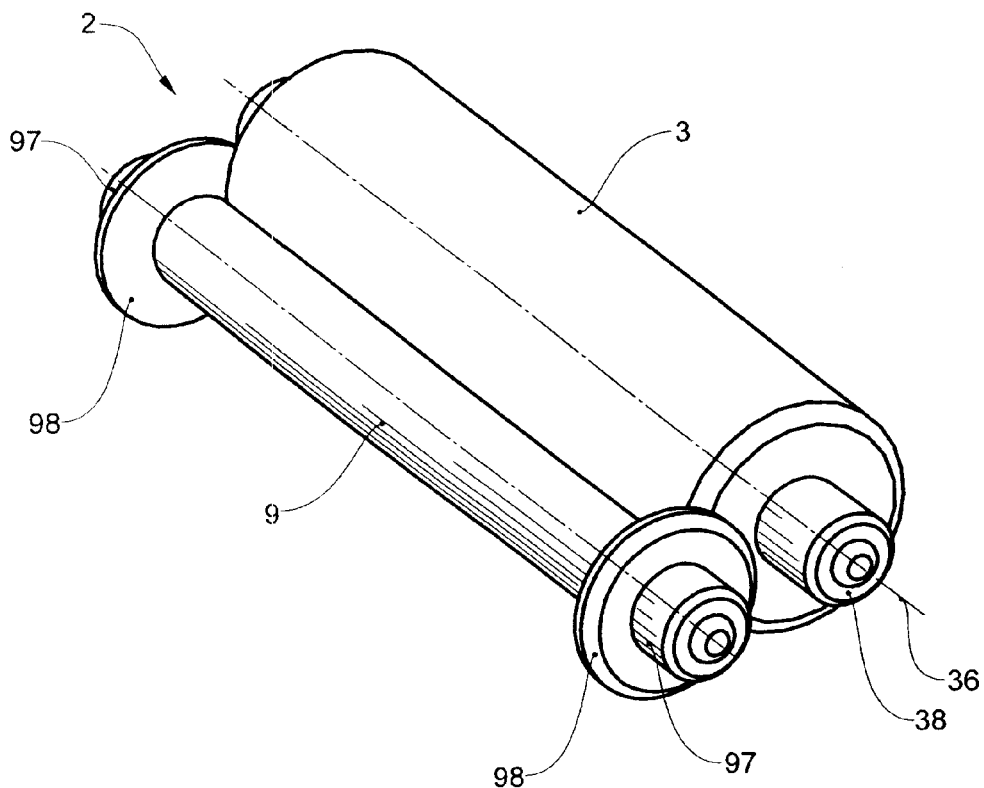
Figure 16:
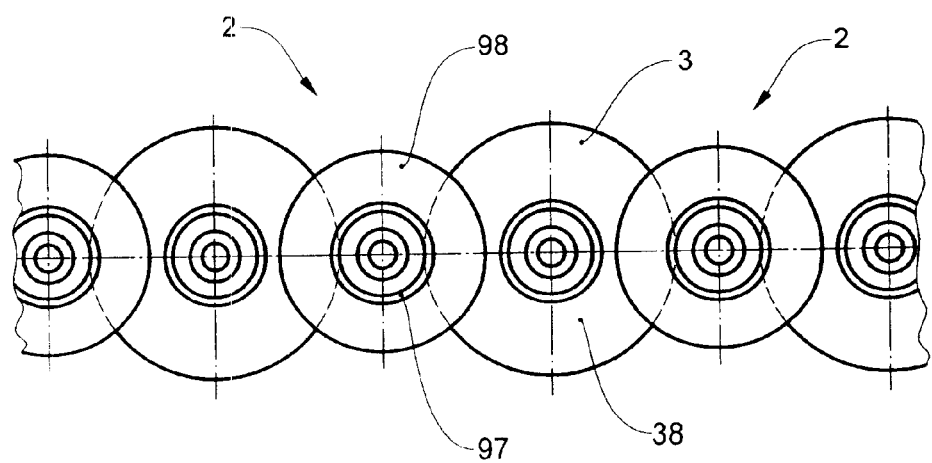

FIGS. 15 and 16 show views of support rollers 3 and distancing elements 2, wherein the distancing elements 2 in each case comprise an individual distancing roller 9 with bearings, in particular sliding bearings 97. The sliding bearings 97 in each case comprise peripheral shoulders 99 which encompass the support rollers 3 in the axial direction and guide them. In the shown example, the support rollers 3 also comprise sliding bearings 38 which roll or slide in the same guide groove 71 as the sliding bearings 97 of the distancing rollers 9. The other embodiments of the invention may also be realised with sliding bearings, and this embodiment of FIGS. 15 and 16 may also be realised with roller bearings. In a further embodiment of the invention, the distancing rollers have no bearing, and a shoulder 99 is formed out on the distancing roller 9, thus rotates with the distancing roller 9

The diameter of the support rollers 3, in particular with a design with plastic rollers in a lightweight conveyor for high loads, lies for example between 10 mm and 30 mm, preferably around 20 mm, and the diameter of the distancing rollers 9 between 5 mm and 15 mm. The length of an individual support device 12 is for example 300 mm to 500 mm or longer, wherein several support devices 12 may be applied onto one another, in order to bridge infinite distances.

LIST OF REFERENCE NUMERALS

1 conveyor device
11 support region
12 support device
2 distancing element
3 support roller
3a, 3b, 3c roller sections
35 pivot stub of the support rollers
36 roller axis
37 roller bearing
38 sliding bearing
4 roller unit
5 roller body
6 belt
61 intermediate element
62 intermediate roller
63 pivot
64 bearing
7 support body
71 guide groove
72 support surface
73 central body
74 side element
8 relief element
81 lowering of the guide groove
82 recess of the support surface
83 path narrowing
9,9a,9b distancing roller
91 bearing element
92 holding belt
93 elongate hole
94 snap connection
95 pivot stubs of the distancing rollers
96 pivot extension
97 sliding bearing
98,99 shoulder
10 conveyed goods

The invention claimed is:

1. A support device for conveying heavy loads, comprising:
   a support body and
   a roller body which revolves around the support body,
   wherein the roller body comprises a series of support rollers and distancing rollers,
   wherein the distancing rollers have a smaller diameter than the support rollers, and the distancing rollers in each case space consecutive support rollers from one another,
   wherein the support device is provided for supporting a load which moves along a support region, and the roller body, at least in the support region, is covered over its whole width by a belt, and thus the support rollers roll on the support body and on the belt, in the support region, and
   wherein in each case two distancing rollers are arranged between two consecutive support rollers.

2. A support device according to claim 1, wherein pivots of the support rollers define a reference surface, in which they move, and pivots of an outer group of distancing rollers run outside the reference surface, and pivots of an inner group of distancing rollers run within the reference surface.

3. A support device according to claim 1, wherein in each case two distancing rollers are rotatably mounted on at least one co-moved bearing element.

4. A support device according to claim 3, wherein apart from the in each case two distancing rollers, a support roller is also movably fastened in each case on the at least one co-moved bearing element, and these rollers together form a roller unit.

5. A support device according to claim 1, in which in each case a holding belt wraps around two distancing rollers which are assigned to one another, or around pivots of these distancing rollers.

6. A support device according to claim 4, wherein, in the case that the support roller and a lower distancing roller of a roller unit both lie on a support surface, the rotation axis of an upper distancing roller lies above a plane which runs through the rotation axis of the support roller and parallel to the support surface.

7. A support device according to claim 6, wherein the distancing rollers slip or tilt against the support surface when two support rollers or roller units are pulled apart, and the distancing rollers are lifted up or set up again when the roller units collide.

8. A support device according to claim 4, wherein in a roller unit, the support roller comprises at least three coaxial sections, which are connected to one another via a roller pivot, a bearing element is rotatably arranged on the roller pivot, in each case between two of these sections, and the two distancing rollers are mounted between the two bearing elements.

9. A support device according to claim 1, wherein the support body comprises two peripheral guide grooves, and the support rollers are guided in the guide grooves by way of pivot stubs, and the distancing rollers are guided in the guide grooves or in further guide grooves by way of pivot stubs.

10. A support device according to claim 9, wherein the support rollers or the distancing rollers are mounted in the guide grooves by way of roller bearings or by way of sliding bearings.

11. A support device according to claim 1, wherein in each case exactly one distancing roller is arranged between two consecutive support rollers.

12. A support device according to claim 1, wherein a shoulder of a bearing element or of a bearing projects in the radial direction into an enveloping cylinder of the support roller and by way of this limits a movement of the support roller along the direction of its roller axis.

13. A conveying device with two or more support devices according to claim 1, wherein the support devices are arranged in series behind one another, and an intermediate element with at least one movable support element, in particular with an intermediate roller, is arranged between the support devices and wherein the support devices and the intermediate element can be strung together with a positive fit.

14. A conveyor device according to claim 13, wherein support devices and intermediate elements form a modular construction system, with which support devices and intermediate elements may be strung together in an infinite number, for forming the conveyor device.

15. A conveyor device according to claim 13, wherein the intermediate elements are integrated into the support devices, and the support devices with the integrated intermediate elements may be strung together, preferably with a positive fit.

16. A conveyor device according to claim 13, wherein several rows, in each case with several support devices and intermediate elements, are arranged parallel to one another, in the conveyor device.

17. A conveyor device according to claim 13, wherein the conveyor device is inclined at least in sections.

18. A support device for conveying heavy loads, comprising:
a support body and
a roller body which revolves around the support body,
wherein the roller body comprises a series of support rollers and distancing rollers,
wherein the distancing rollers have a smaller diameter than the support rollers, and the distancing rollers in each case space consecutive support rollers from one another,
wherein the support device is provided for supporting a load which moves along a support region, and thus the support rollers roll on the support body, in the support region, and
wherein in each case two distancing rollers are arranged between two consecutive support rollers.

19. A support device for conveying heavy loads, comprising:
a support body and
a roller body which revolves around the support body,
wherein the roller body comprises a series of support rollers and distancing rollers,
wherein the distancing rollers have a smaller diameter than the support rollers, and the distancing rollers in each case space consecutive support rollers from one another,
wherein the support device is provided for supporting a load which moves along a support region, and the roller body, at least in the support region, is covered over its whole width by a belt, and thus the support rollers roll on the support body and on the belt, in the support region, and
wherein the support devices are arranged in series behind one another, and an intermediate element with at least one movable support element, in particular with an intermediate roller, is arranged between the support devices and wherein the support devices and the intermediate element are strung together with a positive fit.

* * * * *